United States Patent [19]
Todd

[11] Patent Number: 5,722,253
[45] Date of Patent: Mar. 3, 1998

[54] GOLF BAG WITH COOLERS

[76] Inventor: J. Brian Todd, 1193 Eldorado Ave., Oshawa, Ontario, Canada, L1K1E9

[21] Appl. No.: 753,739

[22] Filed: Nov. 29, 1996

[51] Int. Cl.⁶ .................................................. F25D 3/08
[52] U.S. Cl. .................... 62/457.5; 62/457.2; 62/371; 62/331; 206/315.5
[58] Field of Search ................ 62/371, 331, 457.1, 62/457.2, 457.5, 457.4, 457.6; 206/315.3, 315.5

[56] References Cited

U.S. PATENT DOCUMENTS

| | | | |
|---|---|---|---|
| 4,282,912 | 8/1981 | Brown | 206/315.5 |
| 4,459,827 | 7/1984 | Rhodes | 62/457.5 |
| 5,222,598 | 6/1993 | Yamazoe | 206/315.5 |
| 5,372,890 | 12/1994 | Penxa | 62/457.4 |

*Primary Examiner*—John M. Sollecito

[57] ABSTRACT

A new Golf Bag With Coolers for providing cool drinks while on a golf course. The inventive device includes a standard golf bag having upper and lower coolers, the upper cooler being sized to snugly secure a beverage container to keep it from tipping, and the lower cooler being detachably secured to the bag and including a drain spout to allow draining of liquids from the lower cooler.

10 Claims, 3 Drawing Sheets

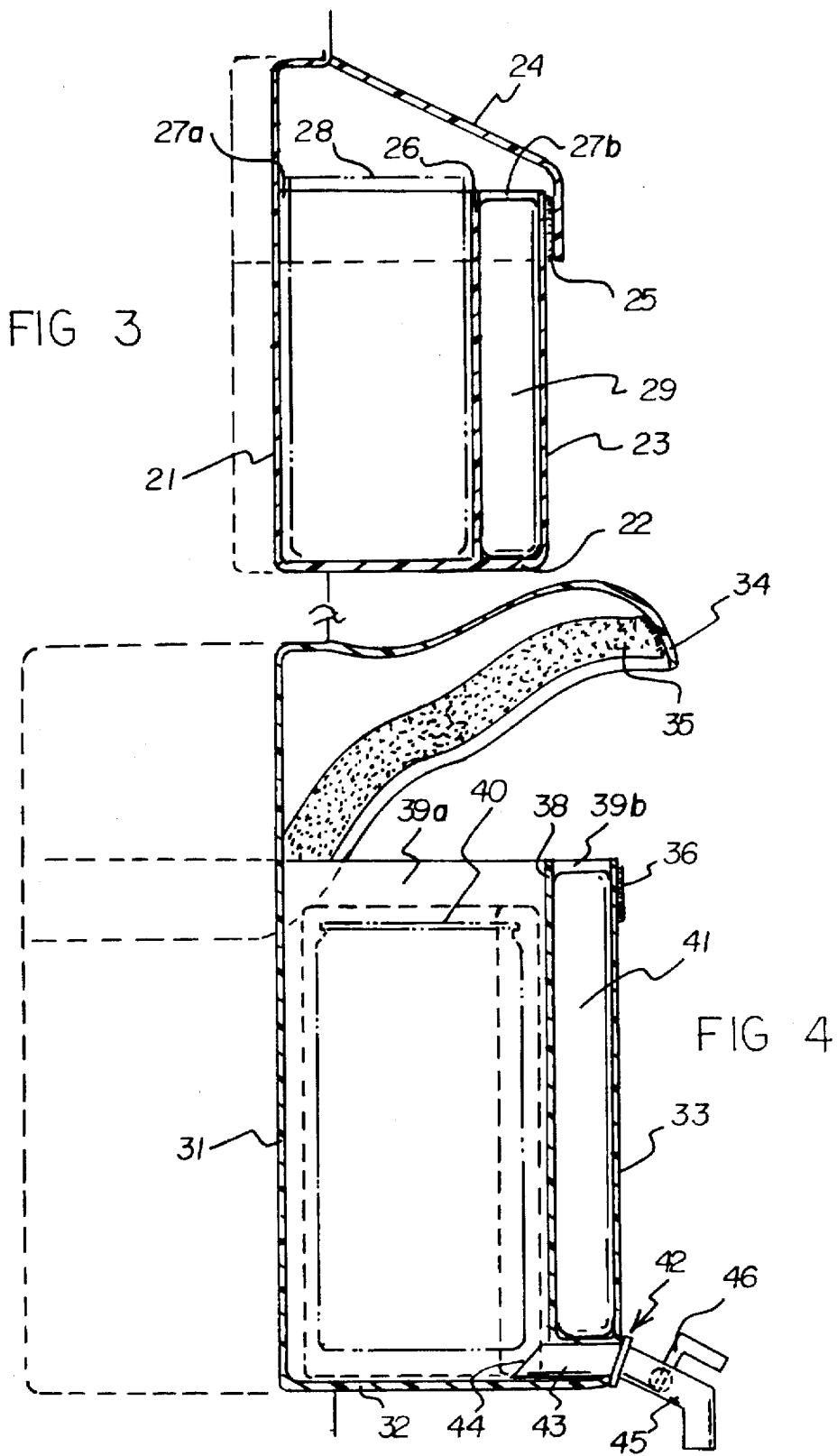

GOLF BAG WITH COOLERS

BACKGROUND OF THE INVENTION

1. Field of the Invention

The present invention relates to golf bags with coolers and more particularly pertains to a new Golf Bag With Coolers for providing cool drinks while on a golf course.

2. Description of the Prior Art

The use of golf bags with coolers is known in the prior art. More specifically, golf bags with coolers heretofore devised and utilized are known to consist basically of familiar, expected and obvious structural configurations, notwithstanding the myriad of designs encompassed by the crowded prior art which have been developed for the fulfillment of countless objectives and requirements.

Known prior art golf bags with coolers include U.S. Pat. Nos. 5,301,519; 5,222,598; Des. 330,631; 4,889,267; Des. 293,851 and 4,459,827.

While these devices fulfill their respective, particular objectives and requirements, the aforementioned patents do not disclose a new Golf Bag With Coolers. The inventive device includes a standard golf bag having upper and lower coolers, the upper cooler being sized to snugly secure a beverage container to keep it from tipping, and the lower cooler being detachably secured to the bag and including a drain spout to allow draining of liquids from the lower cooler.

In these respects, the Golf Bag With Coolers according to the present invention substantially departs from the conventional concepts and designs of the prior art, and in so doing provides an apparatus primarily developed for the purpose of providing cool drinks while on a golf course.

SUMMARY OF THE INVENTION

In view of the foregoing disadvantages inherent in the known types of golf bags with coolers now present in the prior art, the present invention provides a new Golf Bag With Coolers construction wherein the same can be utilized for providing cool drinks while on a golf course.

The general purpose of the present invention, which will be described subsequently in greater detail, is to provide a new Golf Bag With Coolers apparatus and method which has many of the advantages of the golf bags with coolers mentioned heretofore and many novel features that result in a new Golf Bag With Coolers which is not anticipated, rendered obvious, suggested, or even implied by any of the prior art golf bags with coolers, either alone or in any combination thereof.

To attain this, the present invention generally comprises a standard golf bag having upper and lower coolers, the upper cooler being sized to snugly secure a beverage container to keep it from tipping, and the lower cooler being detachably secured to the bag and including a drain spout to allow draining of liquids from the lower cooler.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Golf Bag With Coolers apparatus and method which has many of the advantages of the golf bags with coolers mentioned heretofore and many novel features that result in a new Golf Bag With Coolers which is not anticipated, rendered obvious, suggested, or even implied by any of the prior art golf bags with coolers, either alone or in any combination thereof.

It is another object of the present invention to provide a new Golf Bag With Coolers which may be easily and efficiently manufactured and marketed.

It is a further object of the present invention to provide a new Golf Bag With Coolers which is of a durable and reliable construction.

An even further object of the present invention is to provide a new Golf Bag With Coolers which is susceptible of a low cost of manufacture with regard to both materials and labor, and which accordingly is then susceptible of low prices of sale to the consuming public, thereby making such Golf Bag With Coolers economically available to the buying public.

Still yet another object of the present invention is to provide a new Golf Bag With Coolers which provides in the apparatuses and methods of the prior art some of the advantages thereof, while simultaneously overcoming some of the disadvantages normally associated therewith.

Still another object of the present invention is to provide a new Golf Bag With Coolers for providing cool drinks while on a golf course.

Yet another object of the present invention is to provide a new Golf Bag With Coolers which includes a standard golf bag having upper and lower coolers, the upper cooler being sized to snugly secure a beverage container to keep it from tipping, and the lower cooler being detachably secured to the bag and including a drain spout to allow draining of liquids from the lower cooler.

Still yet another object of the present invention is to provide a new Golf Bag With Coolers that keeps beverages cooler for a longer period of time.

Even still another object of the present invention is to provide a new Golf Bag With Coolers that makes a round of golf more enjoyable.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3—3 of FIG. 2.

FIG. 4 is a cross sectional view taken along line 4—4 of FIG. 2.

DESCRIPTION OF THE PREFERRED EMBODIMENT

Figure 1:
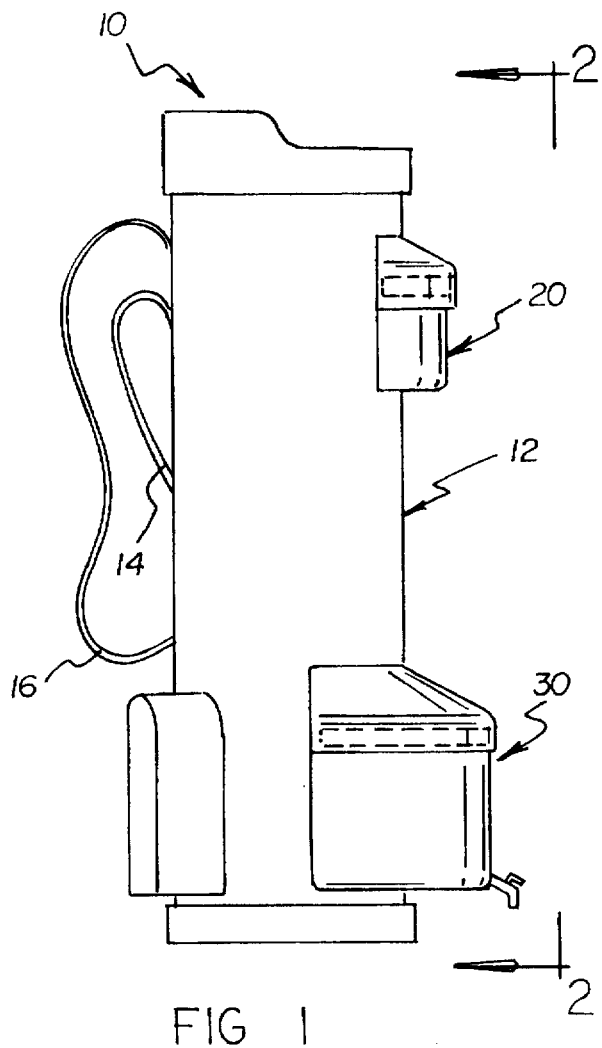
FIG. 1 is a side perspective view of a new Golf Bag With Coolers according to the present invention.
Figure 2:
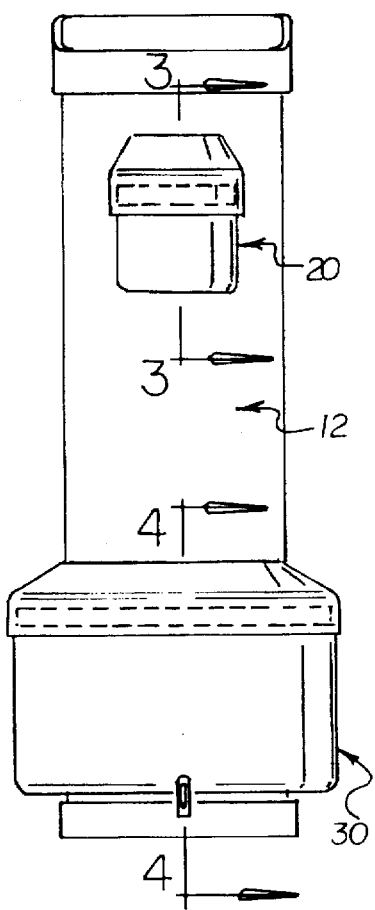
FIG. 2 is a view taken along line 2—2 of FIG. 1.

With reference now to the drawings, and in particular to FIGS. 1 through 6 thereof, a new Golf Bag With Coolers embodying the principles and concepts of the present invention and generally designated by the reference numeral 10 will be described.

More specifically, it will be noted that the Golf Bag With Coolers 10 comprises a bag portion 12, an upper cooler 20 attached near a top end of the bag portion, and a lower cooler 30 attached near a bottom end of the bag portion.

As best illustrated in FIGS. 1 through 6, it can be shown that the bag portion 12 is of conventional structure including an interior space for holding golf clubs, a handle 14, and a shoulder strap 16. The bag portion can have an outer covering of a material commonly used for golf bags, such as nylon, vinyl, leather, or the like.

Attached to the bag portion near the top thereof is an upper cooler 20. The cooler 20 is disposed on the opposite side of the bag portion 12 from the handle 14 and strap 16. The cooler can be formed of the same material as the outer covering of the bag portion, or of a different material. However, the cooler is non-rigid so that it can flex. Preferably, the cooler 20 is permanently affixed to the bag portion, however it may be removably attached if desired.

As best seen in FIG. 3, the cooler 20 includes a rear wall 21, a bottom wall 22, and a front wall 23, thus defining a chamber which is closed at the top by a flap 24. The flap 24 is flexible and one edge thereof is attached to the bag portion 12 or the rear wall 21, such that the flap pivots about the attached edge to open/close the chamber. The free edge of the flap includes one piece of a hook and loop type fastener 25, while the top edge of the front wall 23 includes the other piece, thus providing a means for securing the flap in the closed position. The cooler 20 is suitably insulated, as would be known to a person having ordinary skill in the art. For instance, the cooler may be lined with neoprene to retain cold and withstand the moist environment.

The chamber includes a dividing wall 26 extending from the bottom wall 22 which divides the chamber into separate compartments 27a,27b. The compartment 27a is sized to snugly receive a beverage container 28 (shown in dashed lines) such as a can or cup. The compartment 27a should be sized so that the container 28 cannot shift or tip relative to the cooler, thus keeping the container 28 upright within the compartment 27a and preventing spills. The compartment 27a could be sized to receive more than one container, in which case the compartment would prevent shifting or tilting of each container.

The compartment 27b is shaped and sized to receive a cooling medium, such as a frozen ice pack 29 of the type which can be refrozen and reused. The ice pack 29 keeps the beverage within the container 28 cooled during a round of golf. Ice could be used in place of the ice pack 29 if desired.

The bottom cooler 30 is similar to the upper cooler 20, in that it includes a rear wall 31, bottom wall 32, and a front wall 33 defining a chamber, and a flap 34 for closing the chamber. The bottom cooler is also non-rigid, so that the walls and flap can flex. The flap 34 is attached along one edge to the rear wall 31, such that the flap pivots about the attached edge to open/close the chamber. The free edge of the flap includes one piece 35 of a hook and loop type fastener, while the top edge of the wall 33 includes the other piece 36. This provides a means for securing the flap in the closed position.

Figure 5:
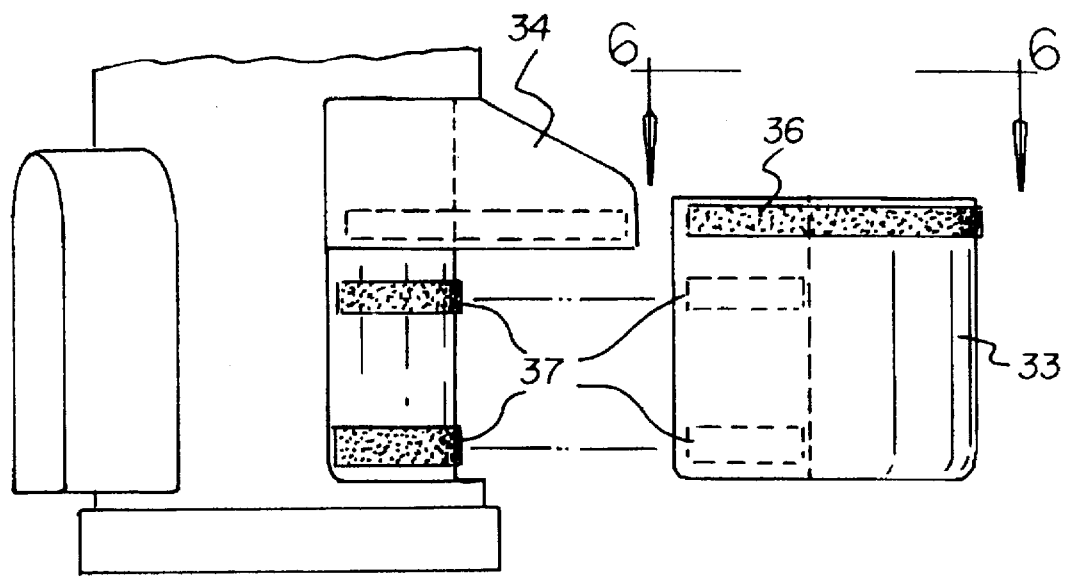
FIG. 5 is a view of an alternate embodiment of the lower cooler.
Figure 6:
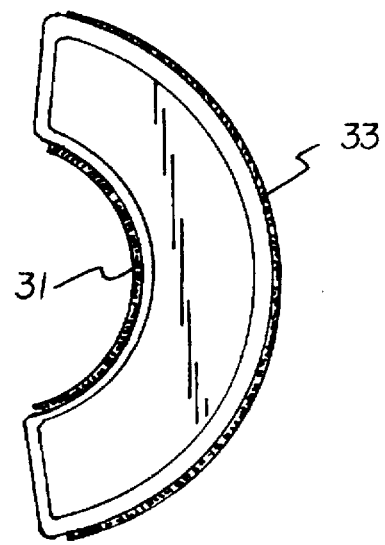
FIG. 6 is a view taken along line 6—6 of FIG. 5.

The cooler 30 is either permanently affixed to the bag portion, or as is shown in FIG. 5, it can be removably attached to the bag portion. FIG. 5 illustrates a plurality of hook and loop type fastening devices 37 secured to the bag portion and the rear wall 31, in order to allow the cooler to be removed from the bag portion.

The bottom cooler also includes a dividing wall 38 extending from the bottom wall 32 to divide the chamber into separate compartments 39a,39b. The compartment 39a is relatively large enabling it to hold numerous beverage containers 40. The compartment 39b is similar to the compartment 27b in that it is shaped and sized to receive a cooling medium, such as a frozen ice pack 41 of the type which can be refrozen and reused. The ice pack 41 keeps the beverages within the containers 40 cooled during a round of golf. Ice could be used in place of the ice pack 41 if desired.

Disposed at the bottom of the cooler 30 is a drain spout 42. The drain spout 42 includes an inlet portion 43 extending through the dividing wall 38 and running beneath the pack 41. The portion 43 includes an inlet 44 for liquids. The portion 43 extends through the front wall 33 and leads to an outlet portion 45 having a liquid outlet and an on/off valve device 46. Since liquids can accumulate within the cooler 30, e.g. condensation from the containers 40, spilled beverages, melting ice, etc., the drain spout permits draining of the cooler to remove the liquid. The bottom cooler is also suitably insulated, such as by a neoprene lining.

In use, the upper cooler and lower coolers provide a system for permitting easier access to beverages, reducing the amount of stooping or bending required. This system also prevents spills and permits easy clean up. Before a round of golf, the ice packs are frozen and placed within their respective coolers. The bottom cooler is also filled with the golfers desired beverages. During the round, once a beverage is opened or placed in a cup, it is placed within the upper cooler 20, so that the golfer does not have to bend over to reach the lower cooler. The upper cooler also securely retains the container so that it does not shift or tip, thus preventing spillage. Therefore the upper cooler provides easy, convenient access to an opened beverage, while the bottom cooler provides a place for storing additional beverages. If liquids accumulate within the bottom cooler, they can be easily drained by opening the drain spout 42.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An arrangement of coolers on a golf bag having a generally cylindrical exterior surface and top and bottom ends, comprising:

an upper insulated cooler secured to an upper portion of the golf bag, said upper cooler being sized to receive a beverage container such that the beverage container would be substantially prevented from shifting relative to the upper cooler, said upper cooler having an upper cooler cup comprising an arcuate rear wall for locating adjacent to the generally cylindrical exterior surface of said bag portion, an arcuate front wall substantially uniformly spaced from said arcuate rear wall, and end walls extending between corresponding ends of the front and rear walls, said front, back and end walls forming a perimeter wall, a bottom wall being joined to said perimeter wall for closing one side of said perimeter wall, said upper cooler cup having a dividing wall located inward of said front wall and extending in a substantially parallel relationship to said front wall to divide said upper cooler cup into a central beverage container receiving compartment and a cooling compartment adjacent the central compartment, said cooling compartment being open opposite said bottom wall to permit a cooling medium to be removably placed in the cooling compartment to cool the contents of said central compartment; and a lower insulated cooler secured to a lower portion of the bag, said lower cooler having a size sufficient to receive a plurality of beverage containers, said lower cooler having a lower cooler cup comprising an arcuate rear wall for locating adjacent to the generally cylindrical exterior surface of said bag portion, an arcuate front wall substantially uniformly spaced from said arcuate rear wall, and end walls extending between corresponding ends of the front and rear walls, said front, back and end walls forming a perimeter wall, a bottom wall being joined to said perimeter wall for closing one side of said perimeter wall, said first cooler cup having a dividing wall located inward of said front wall and extending in a substantially parallel relationship to said front wall to divide said lower cooler cup into a central beverage container receiving compartment and a cooling compartment adjacent the central compartment, said cooling compartment being open opposite said bottom wall to permit a cooling medium to be removably placed in the cooling compartment to cool the contents of said central compartment.

2. The arrangement of claim 1, wherein the lower cooler cup is detachably secured to the bag by securement means.

3. The arrangement of claim 2, wherein the securement means include hook and loop type fasteners.

4. The arrangement of claim 1, wherein the lower cooler cup further includes a drain spout attached thereto for draining liquid from the cooler.

5. The arrangement of claim 1, wherein the upper cooler includes a cover flap mounted on the exterior surface of said bag portion above said upper cooler cup, the cover flap having a perimeter lip for positioning adjacent to the front wall of the perimeter wall of said upper cooler cup, said perimeter lip and said front wall having hook and loop fastening means mounted thereon for releasably mounting the perimeter lip to said front wall for permitting selective access to the compartments of said upper cooler cup.

6. The arrangement of claim 1, wherein the lower cooler includes a cover flap mounted on the exterior surface of said bag portion, said cover flap being located above said lower cooler cup, the cover flap having a perimeter lip for positioning adjacent to the front wall of the perimeter wall of the lower cooler cup, said perimeter lip and said front wall having hook and loop fastening means mounted thereon for releasably mounting the perimeter lip to said front wall for permitting selective access to the compartments of said lower cooler cup.

7. A golf bag comprising:

a bag portion having an interior for holding golf clubs, generally cylindrical exterior surface, and top and bottom ends; and a first, insulated cooler attached to the exterior surface adjacent the bottom end and having a first cooler cup comprising an arcuate rear wall for locating adjacent to the generally cylindrical exterior surface of said bag portion, an arcuate front wall substantially uniformly spaced from said arcuate rear wall, and end walls extending between corresponding ends of the front and rear walls, said front, back and end walls forming a perimeter wall, a bottom wall being joined to said perimeter wall for closing one side of said perimeter wall, said first cooler cup having a dividing wall located inward of said front wall and extending in a substantially parallel relationship to said front wall to divide said first cooler cup into a central beverage container receiving compartment and a cooling compartment adjacent the central compartment, said cooling compartment being open opposite said bottom wall to permit a cooling medium to be removably placed in the cooling compartment to cool the contents of said central compartment, the arcuate rear wall of said first cooler cup and the exterior surface of said bag portion having hook and loop fastening means thereon for removably mounting said first cooler cup to the exterior surface of said bag portion, said first cooler including a cover flap mounted on the exterior surface of said bag portion, said cover flap being located above the hook and loop fastening means of the removable mounting of said first cooler cup, the cover flap having a perimeter lip for positioning adjacent to the front wall of the perimeter wall of the first cooler cup, said perimeter lip and said front wall having hook and loop fastening means mounted thereon for releasably mounting the perimeter lip to saint front wall for permitting selective access to the compartments of said first cooler cup, wherein said first cooler cup is removable from attachment to the exterior surface of said bag portion without removal of said cooler flap from said bag portion; and wherein said first cooler cup includes a drain spout for draining liquid from the central compartment of said first cooler cup.

8. The golf bag of claim 7, further comprising a second, insulated cooler attached to the exterior surface adjacent the top end.

9. The golf bag of claim 8, wherein the second cooler is sized to receive a beverage container such that the beverage container would be substantially prevented from shifting relative to the second cooler.

10. A golf bag comprising:

a bag portion having an interior for holding golf clubs, a generally cylindrical exterior surface, and top and bottom ends;

a first, insulated cooler having a first cooler cup comprising an arcuate rear wall for locating adjacent to the generally cylindrical exterior surface of said bag portion, an arcuate front wall substantially uniformly spaced from said arcuate rear wall, and end walls extending between corresponding ends of the front and rear walls, said front, back and end walls forming a perimeter wall, a bottom wall being joined to said perimeter wall for closing one side of said perimeter wall, said first cooler cup having a dividing wall located inward of said front wall and extending in a substantially parallel relationship to said front wall to divide said first cooler cup into a central beverage container receiving compartment and a cooling compartment adjacent the central compartment, said cooling compartment being open opposite said bottom wall to permit a cooling medium to be removably placed in the cooling compartment to cool the contents of said central compartment, the arcuate rear wall of said first cooler cup and the exterior surface of said bag portion having hook and loop fastening means thereon for removably mounting said first cooler cup to the exterior surface of said bag portion, said first cooler cup including a drain spout for draining liquid from the central compartment of said first cooler cup, said first cooler including a cover flap mounted on the exterior surface of said bag portion, said cover flap being located above the hook and loop fastening means of the removable mounting of said first cooler cup, the cover flap having a perimeter lip for positioning adjacent to the front wall of the perimeter wall of the first cooler cup, said perimeter lip and said front wall having hook and loop fastening means mounted thereon for releasably mounting the perimeter lip to said front wall for permitting selective access to the compartments of said first cooler cup, wherein said first cooler cup is removable from attachment to the exterior surface of said bag portion without removal of said cooler flap from said bag portion; and a second, insulated cooler attached to the exterior surface adjacent the top end, the second cooler being sized to receive a beverage container such that the beverage container would be substantially prevented from shifting relative to the second cooler;

said second cooler having a second cooler cup comprising an arcuate rear wall for locating adjacent to the generally cylindrical exterior surface of said bag portion, an arcuate front wall substantially uniformly spaced from said arcuate rear wall, and end walls extending between corresponding ends of the front and rear walls, said front, back and end walls forming a perimeter wall, a bottom wall being joined to said perimeter wall for closing one side of said perimeter wall, said second cooler cup having a dividing wall located inward of said front wall and extending in a substantially parallel relationship to said front wall to divide said second cooler cup into a central beverage container receiving compartment and a cooling compartment adjacent the central compartment, said cooling compartment being open opposite said bottom wall to permit a cooling medium to be removably placed in the cooling compartment to cool the contents of said central compartment, the arcuate rear wall of said second cooler cup and the exterior surface of said bag portion having hook and loop fastening means thereon for removably mounting said second cooler cup to the exterior surface of said bag portion, said second cooler cup including a drain spout for draining liquid from the central compartment of said second cooler cup, said second cooler including a cover flap mounted on the exterior surface of said bag portion, said cover flap being located above the hook and loop fastening means of the removable mounting of said second cooler cup, the cover flap having a perimeter lip for positioning adjacent to the front wall of the perimeter wall of the first cooler cup, said perimeter lip and said front wall having hook and loop fastening means mounted thereon for releasably mounting the perimeter lip to said front wall for permitting selective access to the compartments of said second cooler cup, wherein said second cooler cup is removable from attachment to the exterior surface of said bag portion without removal of said cooler flap from said bag portion.

* * * * *